United States Patent [19]

Kern et al.

[11] Patent Number: 5,767,641
[45] Date of Patent: Jun. 16, 1998

[54] CIRCUIT AND METHOD FOR THE ACTUATION OF A BRUSHLESS DC MOTOR

[75] Inventors: Robert Kern, Sasbachwalden; Michael Soellner, Rheinmuenster, both of Germany

[73] Assignee: Robert Bosch GmbH, Stuttgart, United Kingdom

[21] Appl. No.: 793,517

[22] PCT Filed: Aug. 22, 1995

[86] PCT No.: PCT/DE95/01106

§ 371 Date: Feb. 25, 1997

§ 102(e) Date: Feb. 25, 1997

[87] PCT Pub. No.: WO96/08864

PCT Pub. Date: Mar. 21, 1996

[30] Foreign Application Priority Data

Sep. 13, 1994 [DE] Germany ............... 44 32 530.4

[51] Int. Cl.[6] ............................................. H02P 6/16
[52] U.S. Cl. ................... 318/254; 318/138; 318/439
[58] Field of Search .............................. 318/138, 139, 318/245, 256, 439; 388/805, 813

[56] References Cited

U.S. PATENT DOCUMENTS

| | | | |
|---|---|---|---|
| Re. 34,609 | 5/1994 | Mueller | 318/254 |
| 3,710,216 | 1/1973 | Smith | 318/373 |
| 3,999,108 | 12/1976 | Tanikoshi | 318/138 |
| 4,356,437 | 10/1982 | Saito et al. | 318/254 |
| 4,488,096 | 12/1984 | Cap et al. | 318/328 |
| 4,641,066 | 2/1987 | Nagata et al. | 318/254 |
| 4,651,025 | 3/1987 | Smeulers | |
| 4,782,272 | 11/1988 | Buckley et al. | 318/254 |
| 4,804,892 | 2/1989 | Muller | 318/254 |
| 4,958,948 | 9/1990 | Seima et al. | 388/812 |
| 5,122,715 | 6/1992 | Kimura et al. | 318/138 |
| 5,220,258 | 6/1993 | Hans et al. | |
| 5,319,290 | 6/1994 | Yoshino et al. | |

FOREIGN PATENT DOCUMENTS

| | | |
|---|---|---|
| 34 16 611 A1 | 11/1984 | Germany . |
| 40 19 338 A1 | 12/1991 | Germany . |

*Primary Examiner*—Paul IP
*Attorney, Agent, or Firm*—Spencer and Frank

[57] ABSTRACT

A circuit and a method for actuating a brushless DC motor are proposed. The circuit comprises a delta-connected oscillator (1) for generating a triangular voltage as a function of commutation pulses resulting from the position of the rotor of the DC motor, a sampling and hold circuit (2) for sampling and holding a holding voltage (Ul) from the curve of the triangular voltage as a function of time at the moment of the commutation, and a differential amplifier (4) for amplifying the differential voltage between the triangular voltage and the holding voltage (Ul), with the output signal of the differential amplifier being supplied to the final stage of the actuation control circuit. An additional adder (3) for adding a voltage (U block) to the holding voltage (Ul) sampled from the triangular voltage and held can be used, with the differential voltage between the triangular voltage and the sum of holding voltage (Ul) and block voltage (U block) being amplified in the differential amplifier (4). Thus, the method is characterized in that in the actuating signal the steepness of the slopes is set by varying the amplification of a differential amplifier (4) and/or the length of the blocks by adding a block voltage by means of an adder (3).

10 Claims, 2 Drawing Sheets

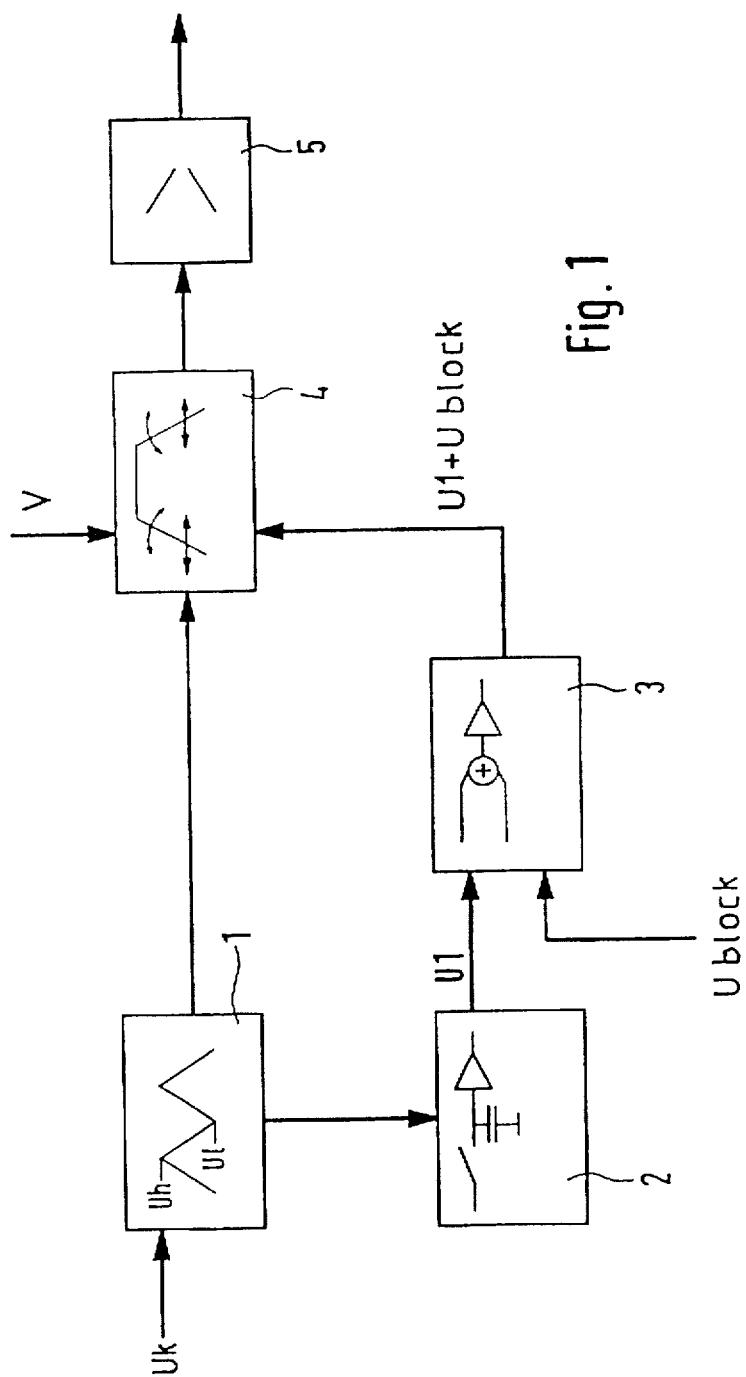

CIRCUIT AND METHOD FOR THE ACTUATION OF A BRUSHLESS DC MOTOR

This application is a 371 of PCT/DE95/01106 filed Aug. 22, 1995.

PRIOR ART

The invention relates to a circuit and a method for the actuation of a brushless DC motor.

Such a DC motor is disclosed, for example, in EP-A-0 482 913. For the actuation of the brushless DC motor, the rotational position of its rotor is determined by picking up the zero passages of the back electromotive force induced in the stator windings by the rotating rotor. Subsequently, a signal generator generates a trapezoidal signal which, after amplification, is applied to the respective stator windings so as to effect a smooth current commutation of the stator windings. This accomplishes a quiet running of the motor.

SUMMARY AND ADVANTAGES OF THE INVENTION

The present invention provides an improved circuit and method for actuating a brushless DC motor with the circuit having a triangular signal oscillator for generating a triangular voltage as a function of commutation pulses resulting from the position of the rotor of the DC motor, a sampling and hold circuit for sampling and holding a holding voltage from the curve of the triangular voltage as a function of time at the moment of the commutation, and a differential amplifier for amplifying the differential voltage between the received triangular voltage and the holding voltage, with the output signal of the differential amplifier being supplied to a final stage of the control circuit for actuation of the motor.

The method according to the invention involves actuating a brushless DC motor with a periodic voltage whose curve as a function of time is formed by voltage blocks of a specific length having rising and falling slopes, and wherein the steepness of the slopes is set by varying the amplification of a differential amplifier at whose output the periodic voltage appears.

The circuit according to the invention as described above and the method according to the invention offer the advantage that the steepness of the current slopes of the individual voltage blocks can be varied. This results in a reduction of the commutation noise. Furthermore, flat slopes can be set, thus ensuring a quiet running of the motor. Moreover, flatter slopes offer the advantage of smaller induction peaks when the current pulses are turned off. Thus, the evaluation of the voltages induced in the three phases of a brushless DC motor is facilitated and an operation without Hall sensors becomes possible. Advantageous modifications and improvements of the circuit and of the method according to the invention are described and disclosed.

It is advisable to use an additional adder in the circuit for adding a voltage U block to the value U1 of the sampled and held triangular voltage, with the difference between the triangular voltage and the sum of holding voltage U1 and block voltage U block being amplified in the differential amplifier. In addition to the option of setting the slope steepness, this also allows a reduction of the length of the individual voltage blocks and thus a quiet running at low speeds due to very flat actuation slopes and, at the same time, an improvement of the efficiency at higher speeds because of the option of allowing current gaps between the individual voltage blocks.

A further advantage is that the circuit can be easily realized in an integrated circuit. In order to "break" the peaks of the triangular voltage, the upper setting limit of the differential amplifier is selected advantageously such that it is lower than the maximum amplified value of the triangular voltage. This results in a horizontal voltage curve as a function of time of the amplified signal during the time in which the amplified differential voltage exceeds the upper setting limit of the differential amplifier. This also increases the efficiency.

For a flexible and simple setting of the length of the voltage blocks, the value of the added block voltage U block is between zero and the maximum value of the triangular voltage. This allows a setting in which the block length is not reduced, i. e., current gaps during the current supply do not occur, or a shortening of the block length, namely in the extreme case up to a block length of zero.

The amplification of the differential amplifier and therewith the slope steepness can be set just as simply and flexibly.

In a preferred embodiment of the circuit, the triangular signal generator or triangular voltage oscillator comprises a capacitor, a first current source for charging the capacitor and a second current source for discharging the capacitor. These are in particular constant-current sources. For the realization of the circuit, it is therewith possible to get by with only one non-integratable capacitor.

It is advisable to select the currents of the constant-current sources to be proportional to the speed of the rotor, which accomplishes an ideal triangular curve with speed-proportional frequency and essentially constant differential voltage.

DRAWING

Further advantages, characteristics and application options of the present invention result from the drawing and the description below of an embodiment. The drawing shows:

BRIEF DESCRIPTION OF THE DRAWINGS

FIG. 1 is a block diagram of an embodiment of the circuit according to the invention for supplying actuating signals.

DETAILED DESCRIPTION OF THE PREFERRED EMBODIMENT

Figure 2A:
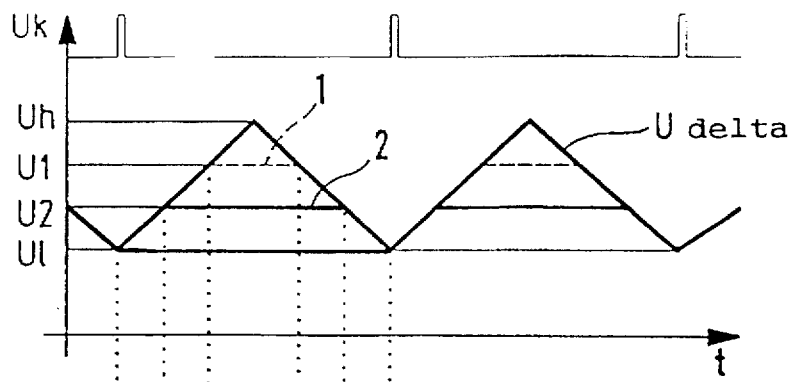
FIG. 2a shows the curve of the triangular voltage as a function of time.

In the embodiment according to the invention shown in FIG. 1, a triangular signal generator or triangular signal oscillator 1 generates a triangular signal. A sampling and hold circuit 2 generates a holding voltage U1 in that the delta voltage is sampled at the moment of a speed-dependent commutation signal Uk coming from a separate circuit, not shown. Together with the output signal of the triangular signal oscillator, this holding signal U1 is supplied to a differential amplifier 4 which amplifies the difference of the two signals and forwards it to the final stage 5 of the actuation or control circuit according to the invention. The slope steepness of the voltage blocks applied to the final stage 5 can be set through a change of the amplification V. This is expressed by way of the curved arrows on the trapezoidal voltage block at 4. Furthermore, a reduction of the block length can be accomplished in that in the adder 3 a block voltage U block is added to the holding voltage Ul. Instead of only Ul, the sum Ul+U block together with the triangular voltage is then applied to the differential amplifier 4, namely, the triangular voltage to the positive input and the sum Ul+U block to the negative input. The setting ability of the block length gained in this manner is indicated by the horizontal, straight arrows in the trapezoidal voltage block at 4.

FIG. 2a shows the curve of the triangular voltage as a function of time each time at the moment of a commutation pulse coming from a separate circuit for detecting the position of the rotor. A capacitor is charged via a current source. When a predetermined voltage Uh is reached, the capacitor is discharged via a second current source. The voltage Ul appears as a function of the value of the capacitor as well as the charging and discharging currents of the current sources which preferably are constant-current sources whose currents increase proportionally with the speed of the motor. If the motor speed is increased, the commutation pulses move closer to one another in time, which causes the time-dependent curve to assume the shape of more acute triangles. But since the current sources are constant- current sources, an ideal triangular curve occurs with virtually constant differential voltage Uh–Ul, which, however, is proportional to the frequency.

Figure 2B:
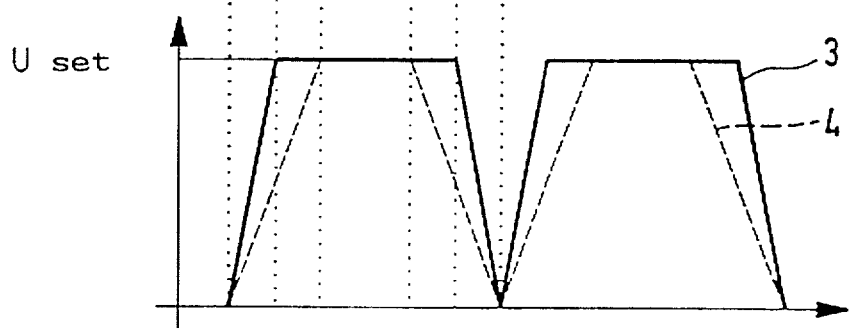
FIG. 2b shows the curve of the actuating pulses as a function of time at full block length and variable slope steepness.

FIG. 2b shows the result of the voltage curve as a function of time of the differential signal amplified by the differential amplifier 4. The differential signal applied to the inputs of the differential amplifier 4 comprises, on the one hand, the triangular signal and, on the other hand, the holding voltage Ul generated in the sampling and holding circuit 2. If the amplification is selected such that at the differential voltage U2–Ul the amplifier reaches its upper setting limit, this results in the curve shape which is identified by 3 in FIG. 2b. In the diagram, the upper setting limit is characterized by U set. This means that only the region between the line 2 and Ul is amplified to this maximum voltage U set. A lesser amplification results in an output signal with flatter slopes, characterized by the curve shape 4. Thus, the method makes it possible to set the steepness of the slopes in wide ranges by changing the amplification.

Figure 3A:
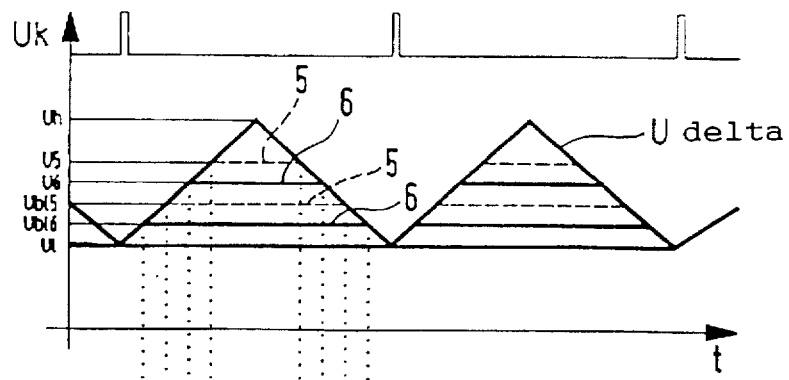
FIG. 3a again shows the curve of the triangular voltage as a function of time.
Figure 3B:
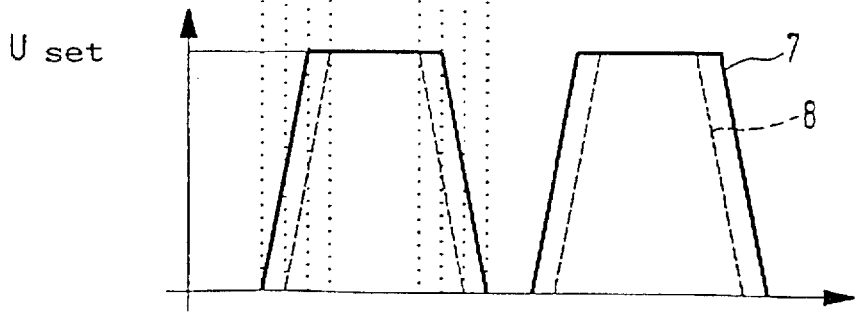
FIG. 3b shows the curve of the actuating pulses as a function of time with reduced block length.

FIG. 3a again shows the curve as a function of time of the triangular voltage in connection with the commutation pulses, which is already illustrated in FIG. 2a. FIG. 3a together with FIG. 3b illustrate how actuating signals with a reduced block length are generated. Because, if a further voltage U block is added to the voltage Ul in the adder 3 and if the differential signal between the triangular signal and this composite voltage Ul+U block is formed, the portion of the triangular voltage in the diagram which is effectively amplified is cut off from below, thus resulting in an overall shortened block length.

The process for generating signals having a shortened block length is now described in greater detail. The lower of the two lines 5 is the composite voltage Ul+U block. If the amplification is selected such that at the differential voltage U5–(Ul+U block) the operational amplifier reaches its setting limit U set, an output signal is formed which corresponds to the curve shape 8. Analogously, the lower of the lines 6 results in the curve shape 7. Therewith it is possible to change the block length by means of the block voltage U block.

By means of the circuit according to the invention and the method according to the invention it is thus possible in a simple manner to set the slope steepness by varying the amplification of a differential amplifier 4 and, independently of this, the block length by adding a block voltage U block in an adder 3.

We claim:

1. A circuit for the actuation of a brushless DC motor comprising:

a triangular signal oscillator means for generating a triangular voltage as a function of commutation pulses resulting from the position of the rotor of the DC motor;

a sampling and hold circuit means for sampling and holding a holding voltage from the curve of the triangular voltage as a function of time at the moment of the commutation;

a differential amplifier for receiving the triangular voltage and the holding voltage and for amplifying the differential voltage between the triangular voltage and the holding voltage; and means for supplying the output signal of the differential amplifier to the final stage of a control circuit for the actuation of the motor.

2. A circuit according to claim 1, further comprising an adder for adding a voltage (U block) to the holding voltage sampled and held from the triangular voltage prior to supplying the holding voltage to the differential amplifier, so that the differential voltage between the triangular voltage and the sum of holding voltage and block voltage (U block) is amplified in the differential amplifier.

3. A circuit according to claim 1, wherein the upper setting limit (U set) of the differential amplifier is set to a value which is lower than the maximum amplified value of the differential voltage.

4. A circuit according to claim 2, wherein the value of the added block voltage is between zero and the maximum value of the triangular voltage.

5. A circuit according to claim 1, wherein the amplification of the differential amplifier is settable.

6. A circuit according to claim 1, wherein the triangular voltage oscillator is provided with a capacitor, a first current source for charging the capacitor and a second current source for discharging the capacitor.

7. A circuit according to claim 6, wherein the first and the second current sources are constant-current sources.

8. A circuit according to claim 6, wherein the currents of the constant current sources are proportional to the speed of the motor rotor.

9. A method for actuating a brushless DC motor including:

providing a periodic voltage whose curve as a function of time is formed by voltage blocks of a specific length having rising and falling slopes at the output of a differential amplifier;

setting the steepness of the slopes by varying the amplification of the differential amplifier; and supplying the periodic voltage to a control circuit for actuating the motor.

10. A method according to claim 9, wherein the upper setting limit (U set) of the differential amplifier is set to a value which is lower than the maximum amplified value of the differential voltage to be amplified which is applied to the differential amplifier.

* * * * *